United States Patent [19]

Gongwer

[11] Patent Number: 5,205,208

[45] Date of Patent: Apr. 27, 1993

[54] FOOD PRODUCT CARRIER FOR AN AUTOMATIC COOKING MACHINE

[75] Inventor: Dean Gongwer, Wakarusa, Ind.

[73] Assignee: Nelgo Manufacturing, Inc., Wakarusa, Ind.

[21] Appl. No.: 917,313

[22] Filed: Jul. 23, 1992

[51] Int. Cl.⁵ .............................................. A47J 37/04
[52] U.S. Cl. ........................................ 99/345; 99/386; 99/402; 99/427; 99/443 C; 198/704; 211/181
[58] Field of Search ................ 99/386, 387, 420, 423, 99/426, 427, 443 R, 443 C, 404–406; 198/704, 803.2; 211/181

[56] References Cited

U.S. PATENT DOCUMENTS

| | | | |
|---|---|---|---|
| 847,147 | 3/1907 | Arthur | 198/803.2 |
| 2,467,411 | 4/1949 | Tingdale | 211/181 |
| 2,846,941 | 8/1958 | Goodwin | 99/427 |
| 2,895,408 | 7/1959 | Glenny | 99/427 |
| 3,188,939 | 6/1965 | Smith | 99/393 |
| 3,269,299 | 8/1966 | Nielsen | 99/421 |
| 3,372,636 | 3/1968 | Marasco | 99/427 |
| 3,499,380 | 3/1970 | Gongwer | 99/346 |
| 4,103,606 | 8/1978 | Gitcho | 99/443 C |
| 4,470,343 | 9/1984 | Didier | 99/448 |
| 4,947,741 | 8/1990 | Gongwer | 99/386 |

FOREIGN PATENT DOCUMENTS 1061273  8/1979  Canada .................. 198/704

Primary Examiner—Timothy F. Simone
Attorney, Agent, or Firm—James D. Hall

[57] ABSTRACT

A food product carrier for use in an automatic food cooking machine having opposed integral retaining wire arch members for accepting retractable pins thereby locking a pivotal wire lid to a wire basket in a closed position which is mounted to the cooking machine and further including an external latch for securing the lid in a closed position while removed from the cooking machine.

2 Claims, 2 Drawing Sheets

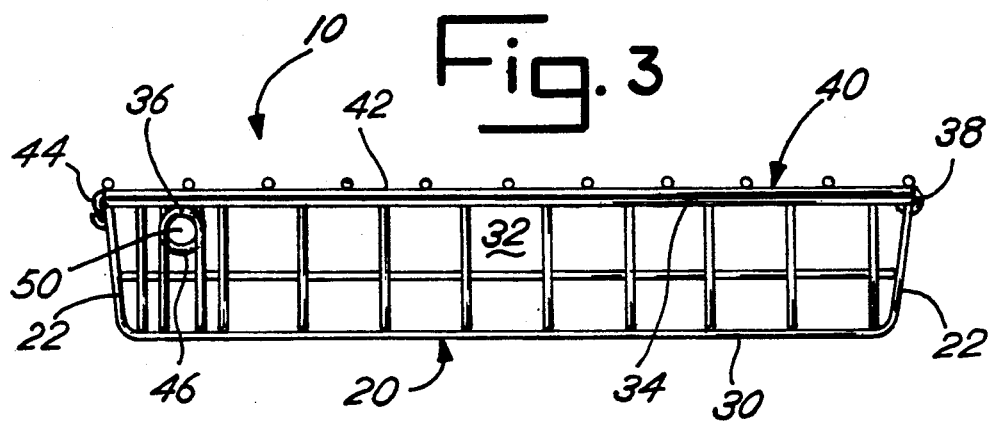
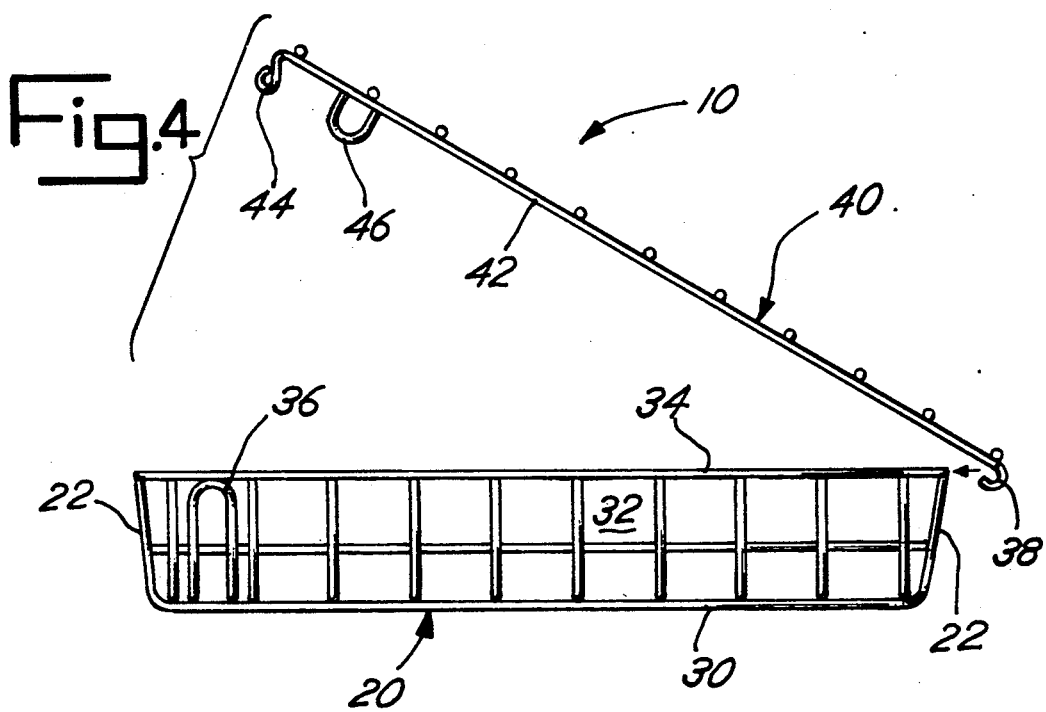

FOOD PRODUCT CARRIER FOR AN AUTOMATIC COOKING MACHINE

This invention relates to improvements in food product carriers and will have special application for food product carriers used in automatic food cooking machines.

BACKGROUND OF INVENTION

The use of wire food product carriers in automatic food cooking machines has been disclosed in several U.S. patents including U.S. Pat. Nos. 3,499,380, 4,947,741 and 4,103,606. Generally, food carriers comprise a multiplicity of wire baskets with lids. The food carriers are attachable to an endless conveyor for conveying and guiding the wire baskets containing food products to be cooked parallel to a heat source within the machine and for rotating the baskets to expose both sides of the food products to the heat source within the cooking machine.

The food carriers are readily removable through an access opening to allow wire baskets containing food products to be added to or removed from the cooking machine. The food carriers are retained on a conveyor assembly inside the cooking machine by retractable pins extending through wire retaining loops in the baskets. Because the wire carriers are rotated during cooking, they each include a fastening latch for securing the lid to the basket. The fastening latch is a simple metal piece affixed to the lid, much like a simple door hasp. The fastening latch hangs down from the lid through the food compartment of the basket and hooks to the inside of the basket. This latch creates additional cleaning and handling problems and provides little security against accidental opening. Upon removal from the automatic cooking machine, the carriers are generally too hot to be handled without gloves, and the additional latch components are difficult to unfasten while the operator is wearing gloves.

SUMMARY OF THE INVENTION

This invention provides for a wire food carrier that incorporates an integral lock for securing the lid closed against the basket. The wire carrier includes two pairs of opposed generally U-shaped wire arch members, one set carried on opposite ends of the basket and the other set extending downward from the ends of the lid. In a closed position, the opposed arch members of the basket and lid overlap to provide a generally circular aperture between the curvatures for accepting retractable pins which also mate with the conveyer assembly (later described in greater detail). With the pins extending through the aperture between the overlapping arch members, the lid is securely locked to the wire basket while inside the food cooking machine without the use of any additional components. While outside the cooking machine, hook fasteners on the lid hook over the outer rim of the basket to hold the lid in a closed position. These additional hook fasteners do not intrude into the food compartment of the carrier and are readily released even by handlers wearing gloves.

Accordingly, it is an object of this invention to provide a novel food product carrier for use in an automatic food cooking machine.

Another object of this invention is to provide a food product carrier that uses integral locking parts for securing a pivotal lid to the basket in a closed position.

Other objects of this invention will become apparent upon a reading of the following description taken with the accompanying drawings.

BRIEF DESCRIPTION OF THE DRAWINGS

FIG. 3 is a side plan view of the carrier shown in a closed position.

FIG. 4 is a side plan view of the carrier shown in an open position.

DESCRIPTION OF THE PREFERRED EMBODIMENT

Figure 1:
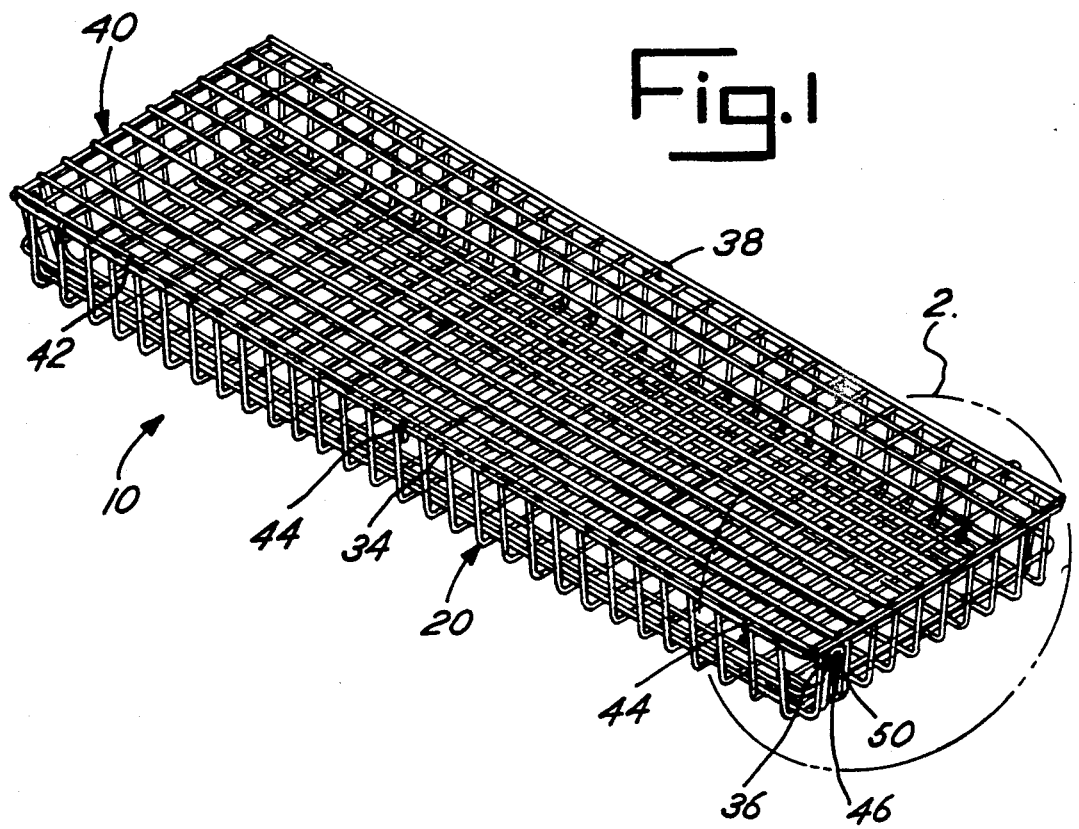
FIG. 1 is a perspective view of the carrier shown in a closed position.

The preferred embodiment herein described is not intended to be exhaustive or to limit the invention to the precise form disclosed. It is chosen and described to illustrate the principles of the invention and its application and practical use to allow others skilled in the art to follow its teachings.

The carriers of this invention are used in automatic food cooking machines of the type disclosed in U.S. Pat. No. 3,499,380. As disclosed in U.S. Pat. No. 3,499,380, a plurality of rods 14 connected to a conveyor chain drive (not shown) transport and support carriers 10 inside the food cooking machine (not shown). Slidable brackets 16 ride on rods 14. At each end of rod 14 are attachments 17, herein merely depicted as a simple knob, to secure rod 14 to the conveyor chain and to prevent bracket 16 from disengaging from rod 14. Each bracket includes inward opposed pins 18 urged by spring 12 for retractable engagement with carrier 10.

It will be understood that, for purposes of illustration and simplicity, the rod and bracket combination is shown as an independent component. In actual use, the rod will normally be fixed to or be a part of the conveyor mechanism of the cooking machine.

As shown in FIG. 1, carrier 10 has an elongated wire basket 20 and pivotally connected wire lid 40 for carrying a quantity of a food product. Basket 20 and lid 40 are constructed from a wire lattice such that the food products are fully exposed to a heat source inside a cooking machine. Basket 20 has front and back sides 22, a pair of ends 26 and a bottom 30 defining a food area 32. The depth of food area 32 defined by sides 22 and end 26 is dependent on the type of food product to be cooked. Wire perimeter rim 34 overlaps the upper surfaces of sides 22 and ends 26.

As shown in FIGS. 1-4, lid 40 provides a secure closure over basket 20 for enclosing the food products. The closure of basket 20 and lid 40 should keep the food products firmly in place to prevent movement therein as carrier 10 is transported on the conveyor inside the cooking machine. Lid 40 has generally a rectangular configuration conforming to basket 20. Lid 40 is pivotally mounted to basket 20 by hinges 38. In this embodiment, each hinge 38 is merely a metal band connecting the top rim of back side 22 of basket 20 and the back rim of lid 40. Two or more external hook fasteners 44 extend from lid 40 on the side opposite hinge 38. With lid 40 in a closed position, hook fasteners 44 are flexed over the top rim of front side 22 of basket 20 to prevent lid 40 from opening while carrier 10 is outside the cooking machine.

Figure 2:
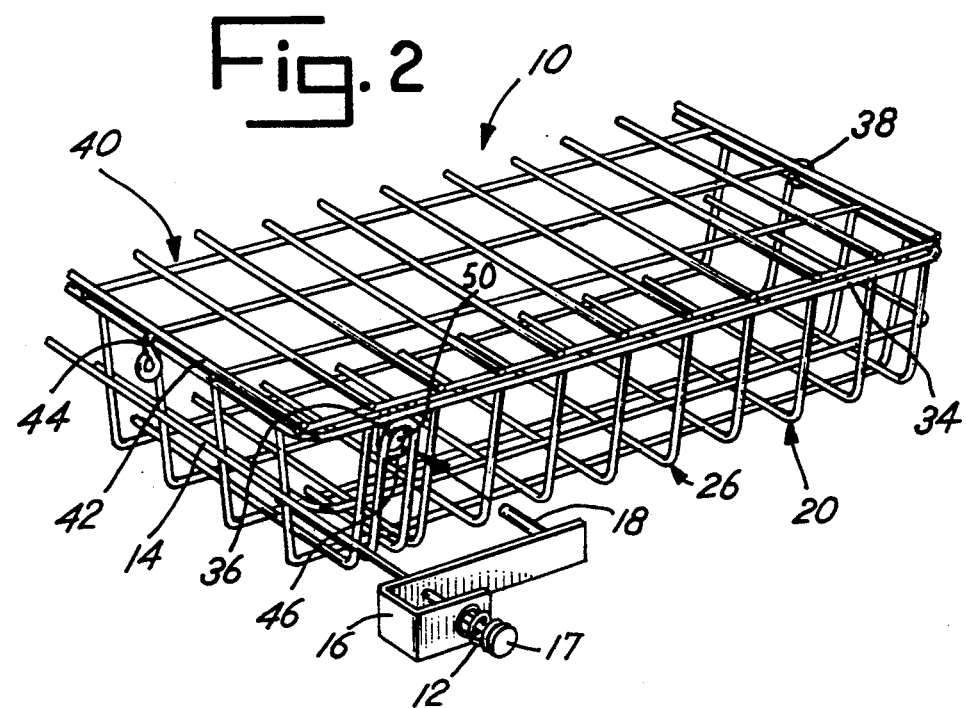
FIG. 2 is a fragmentary perspective view of one end of the carrier showing the alignment of the carrier and the mounting assemblies.

As shown in FIGS. 1-4, basket 20 has a wire arch member 36 located on each end 26 near the front corners of basket 20. The loop or semi-circular portion of arch members 36 are in the plane of ends 26 and open downwardly towards bottom 30 of basket 20. Lid 40 has a pair of wire arch members 46, generally U-shaped, extending downward from end edges near the front edge of lid 40 opposite hinge 38. With lid 40 lying closed over basket 20, arch 46 of lid 40 and arch 36 of basket 20 are adjacently aligned. As seen in FIGS. 2 and 3, arches 46 and 36 align, such that the lower most curvature of arch 46 and the upper most curvature of arch 36 define a circular aperture 50 for accepting pins 18. Pins 18 are insertable through apertures 50.

Carrier 10 is pivotally connected to the conveyor chain within the cooking machine. Pins 18 lock lid 40 in a closed position by preventing arches 46 and 36 from separating. Consequently, while carrier 10 is connected inside the food cooker, lid 40 is locked in a closed position. Only upon removal from the food cooking machine with pins 18 detached from aperture 50, can hook fasteners 44 be disengaged from rim 34 and lid 40 opened.

As previously explained, the inner workings and mechanisms of the cooking machine are fully covered in other patents and do not constitute a part of this invention, which is directed to a unique and novel locking means.

To summarize the operation, we will herein briefly describe a cooking cycle and explain the utility of the present invention. A cooking machine may be transportable to any remote site, e.g., a fairground or picnic area, set up for operation and the heating means activated. Such heating means may be charcoal or a gas burner.

The cooking machine is of a rectangular box-like shape, with an endless conveyor chain on each side. At one side of the machine is an opening across the width of the machine and a shelf. There is a lid over the opening and the shelf is removable.

As previously explained, the food carriers, or wire baskets, may be at different depths to accommodate different food products, e.g., chicken parts or ribs, but are all of a consistent width, in order to allow ready attachment to the conveyor.

In operation, carrier 10 is filled with food products, the lid is closed and the carrier is placed on the shelf. Rod 14, to which are attached brackets 16, is normally attached to or is a part of the conveyor mechanism. While the conveyor is halted, the carrier is moved forward into position and the brackets are moved outwardly by hand against the tension of the springs. When in proper alignment, the pins 18 of the brackets are inserted into the apertures 50 of the carrier 10. Since the brackets are spring-urged toward each other, the lid is firmly secured to the basket, thereby permitting it to be safely turned upside down without spilling its contents.

The conveyor is moved forward and the next carrier is attached to the conveyor. This procedure is continued until the cooking machine is filled. The conveyor attachment prevents the brackets from expanding and the pins from withdrawing from the apertures.

The unique design of the present invention permits the carriers to be conveyed around the circuit with complete safety, without any possibility of the lid opening accidentally and the food products falling therefrom.

When the food products have been completely cooked, the access door is opened and each carrier is removed by following a reverse of the procedure described above.

It is understood that the above description does not limit the invention to the precise form disclosed but may be modified within the scope of the following claims.

I claim:

1. A food product carrier for use in a food cooking machine having an endless conveyor comprising:
   a wire basket having a bottom and side members with an open top portion defining a food holding area therein,
   a wire lid pivotally mounted to said basket for shiftable movement between an open position wherein said lid being spaced apart from said top opening and a closed position wherein said lid overlies said top opening, and
   two opposed wire arch members, a first of said arch members mounted to said basket, a second of said arch members extending from said lid,
   in said open position said first and second arch members spaced apart in a distal relationship in the plane of the overlay,
   in said closed position said arch members in an overlying relationship so as to define an aperture in the plane of the overlay bounded by the curvature between said first and second arch members when viewed in the plane of the overlay,
   whereby said cooking machine includes retractable mounting parts for restrictively engaging said carrier through said aperture when said carrier is in said closed position for securing said carrier to said endless conveyor and preventing said shiftable movement while said carrier is mounted within said cooking machine.

2. The carrier of claim 1 wherein said carrier also includes a latch having a curved wire portion affixed to said lid and restrictively externally engageable with said basket for maintaining said carrier in said closed position while said carrier is disengaged from said cooking machine.

* * * * *